(12) United States Patent
Zhang et al.

(10) Patent No.: US 10,140,009 B2
(45) Date of Patent: Nov. 27, 2018

(54) GESTURE DETECTION ON A DISPLAY DEVICE

(75) Inventors: Xiaoxue Zhang, Nagano (JP); Vladimir Khokhlov, Tokyo (JP)

(73) Assignee: SONY CORPORATION, Tokyo (JP)

( * ) Notice: Subject to any disclaimer, the term of this patent is extended or adjusted under 35 U.S.C. 154(b) by 158 days.

(21) Appl. No.: 14/009,652

(22) PCT Filed: Apr. 10, 2012

(86) PCT No.: PCT/JP2012/002483
§ 371 (c)(1),
(2), (4) Date: Oct. 3, 2013

(87) PCT Pub. No.: WO2012/144160
PCT Pub. Date: Oct. 26, 2012

(65) Prior Publication Data
US 2014/0026096 A1    Jan. 23, 2014

(30) Foreign Application Priority Data

Apr. 19, 2011    (JP) .................. 2011-092917

(51) Int. Cl.
*G06F 3/048*    (2013.01)
*G06F 3/0485*    (2013.01)
*G06F 3/0488*    (2013.01)
*G06F 3/0483*    (2013.01)

(52) U.S. Cl.
CPC .......... *G06F 3/0485* (2013.01); *G06F 3/0483* (2013.01); *G06F 3/0488* (2013.01)

(58) Field of Classification Search
None
See application file for complete search history.

(56) References Cited

U.S. PATENT DOCUMENTS

| | | |
|---|---|---|
| 2002/0051018 A1 | 5/2002 | Yeh |
| 2007/0177803 A1 | 8/2007 | Elias et al. |
| 2007/0177804 A1 | 8/2007 | Elias et al. |
| 2008/0052945 A1 | 3/2008 | Matas et al. |
| 2008/0163130 A1 | 7/2008 | Westerman |
| 2008/0316183 A1* | 12/2008 | Westerman ........... G06F 3/0416 345/173 |

(Continued)

FOREIGN PATENT DOCUMENTS

| | | |
|---|---|---|
| EP | 2284728 A1 | 2/2011 |
| EP | 2309369 A1 | 4/2011 |

(Continued)

OTHER PUBLICATIONS

Kokokara Hajimeruhito no Tameni Hajimete no iPHONE, "Safari de Webpage wo Miru", iPhonePeople Spring-Summer, Apr. 26, 2010, p. 148-149.

(Continued)

*Primary Examiner* — William C Trapanese
(74) *Attorney, Agent, or Firm* — Chip Law Group

(57) ABSTRACT

According to an illustrative embodiment, an electronic apparatus is provided. The apparatus includes a display and an input apparatus operable to detect a gesture on the display. When the display is displaying a first page and the input apparatus detects a drag operation, the display displays a second page in response to the drag operation.

20 Claims, 9 Drawing Sheets

(56) References Cited

U.S. PATENT DOCUMENTS

| | | | |
|---|---|---|---|
| 2009/0100380 A1* | 4/2009 | Gardner | G06F 3/0483 715/854 |
| 2009/0128505 A1* | 5/2009 | Partridge | G06F 3/04883 345/173 |
| 2012/0131497 A1* | 5/2012 | Jitkoff | G06F 3/0481 715/786 |

FOREIGN PATENT DOCUMENTS

| | | |
|---|---|---|
| JP | 2004-030145 A | 1/2004 |
| JP | 2009-525538 A | 7/2009 |

OTHER PUBLICATIONS

"Donna Tsukaikata ga Best? Zenhouikensyo de Zubari Kiru MacBook AIR no 'Mi' to 'Waku'", Mac Fan, Apr. 1, 2008, vol. 16, No. 4 , p. 13.

"Sleipnir MoPad—Web Browser for i PHONE / iPad", [online], Apr. 14, 2011, Youtube, LLC, [Jun. 6, 2012 search], Internet<URL:http://www.youtube.com/watch?feature=player_embedded&v=gmNbZSo3Cy4#at=40>.

"Koresae Osaete Okeba Machigainai! Standard &Hidden tool collection", "Pick up ! Konegetsu no Teiban Tool Sleipnir Ver.2.8.5", Windows 100%, Aug. 1, 2009, vol. 12 , No. 8 , p. 113.

"Honshi Hatsutojyo! Kantan & Benri Kyotan no Koukinou Shinsedai Freesoft", "Kinou Komikomi Browser Benrikinou Zenbumori kinou preset browser", Windows 100%, Apr. 13, 2011, vol. 14, No. 5, p. 42.

"Freesoft wo oitsuduketa Honsh ga Okuru Syugyoku no 150 hon! Dendoiri Freesoft 150+alfa", Windows 100%, Mar. 12, 2011, vol. 14, No. 4, p. 20.

International Search Report from EP Application No. PCT/JP2012/002483, dated Jun. 19, 2012.

"Sleipnir Mobile 1.4 on iPad—Web Browser for i PHONE / iPad", [online], Apr. 14, 2011, Youtube, LLC, [Jun. 6, 2012 search], Internet<URL:http://www.youtube.com/watch?feature=player_embedded&v=gmNbZSo3Cy4#at=40>.

"Sony Daily Reader (TM) User's Guide PRS-900" Jan. 1, 2009 (Jan. 1, 2009), XP055037258, Retrieved from the Internet: URL:http://thekindle.files.wordpress.com/2009/12/sonydailyedition900.pdf.

Anonymous: "Supported Gestures", Internet Citation, May 30, 2008 (May 30, 2008), pp. 1-2, XP002600724, Retrieved from the Internet: URL:http://web.archive.org/web/20080530040409/http://optimoz/mozdev.org/gestures/defaultmappings.html.

Supplementary European Search Report from EP Application No. 12773683, dated Aug. 1, 2014.

* cited by examiner

[Fig. 1]
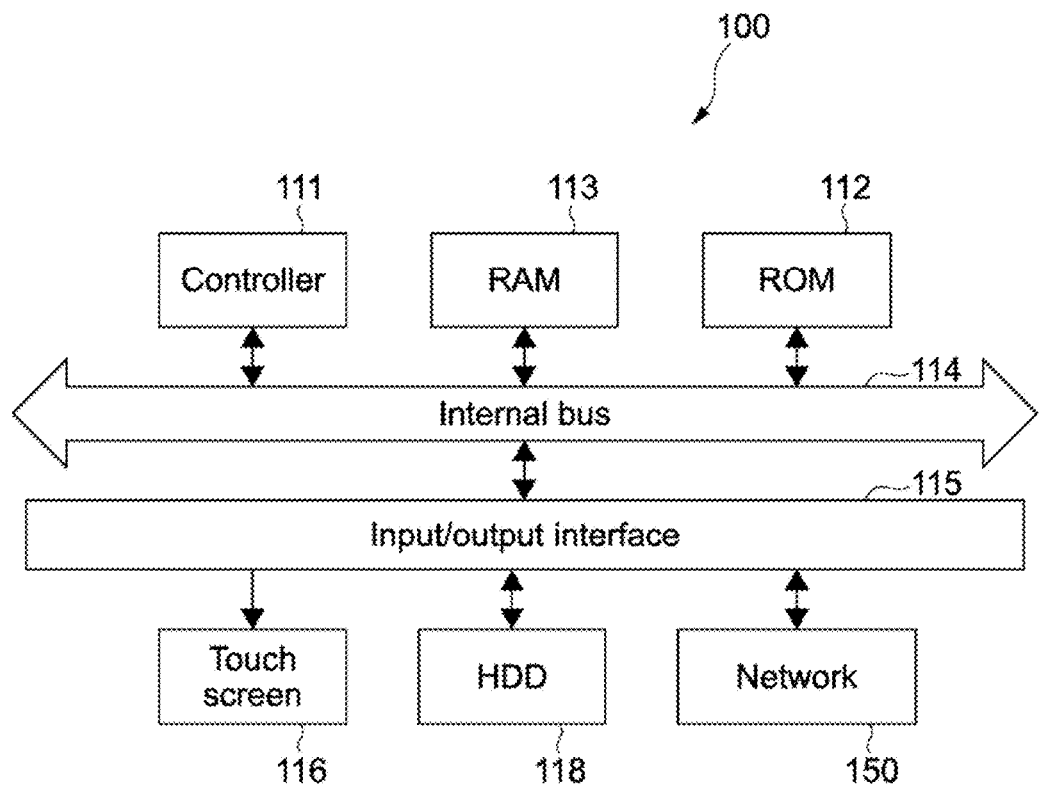
[Fig. 2]
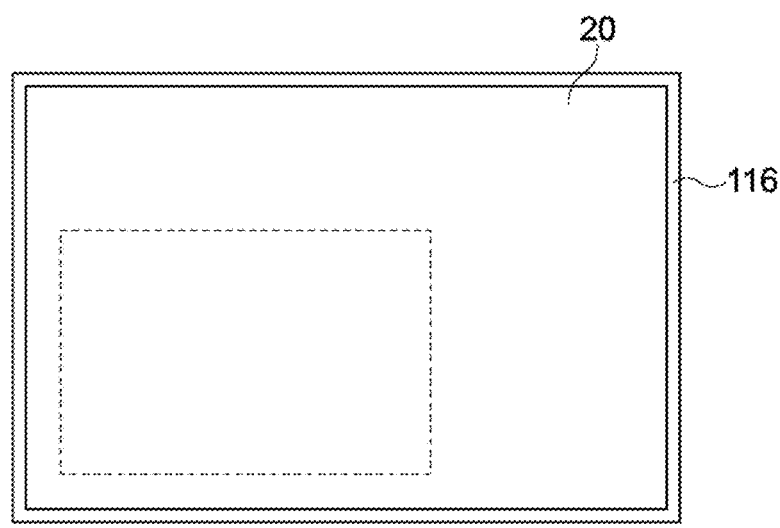

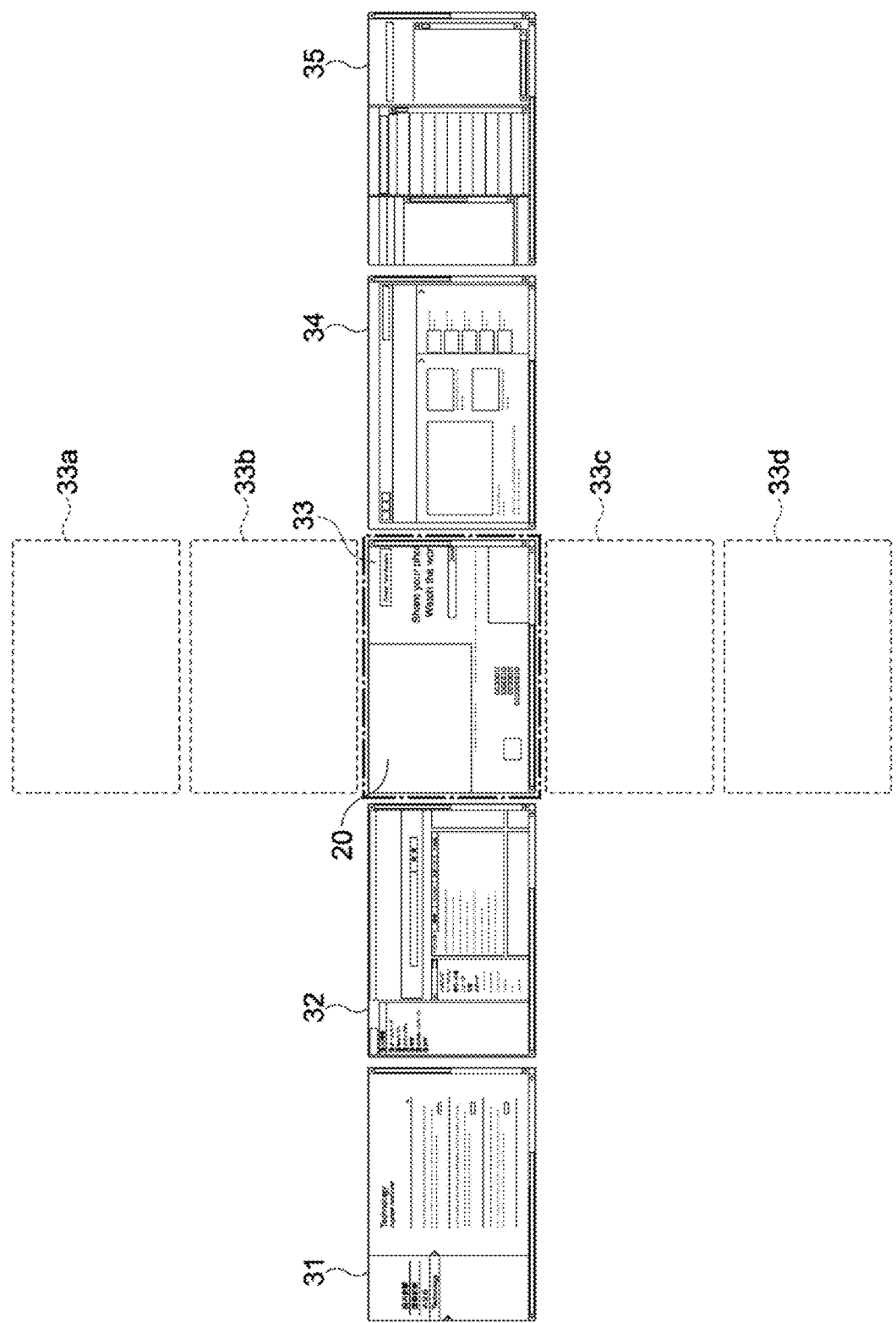
[Fig. 3]

[Fig. 4]
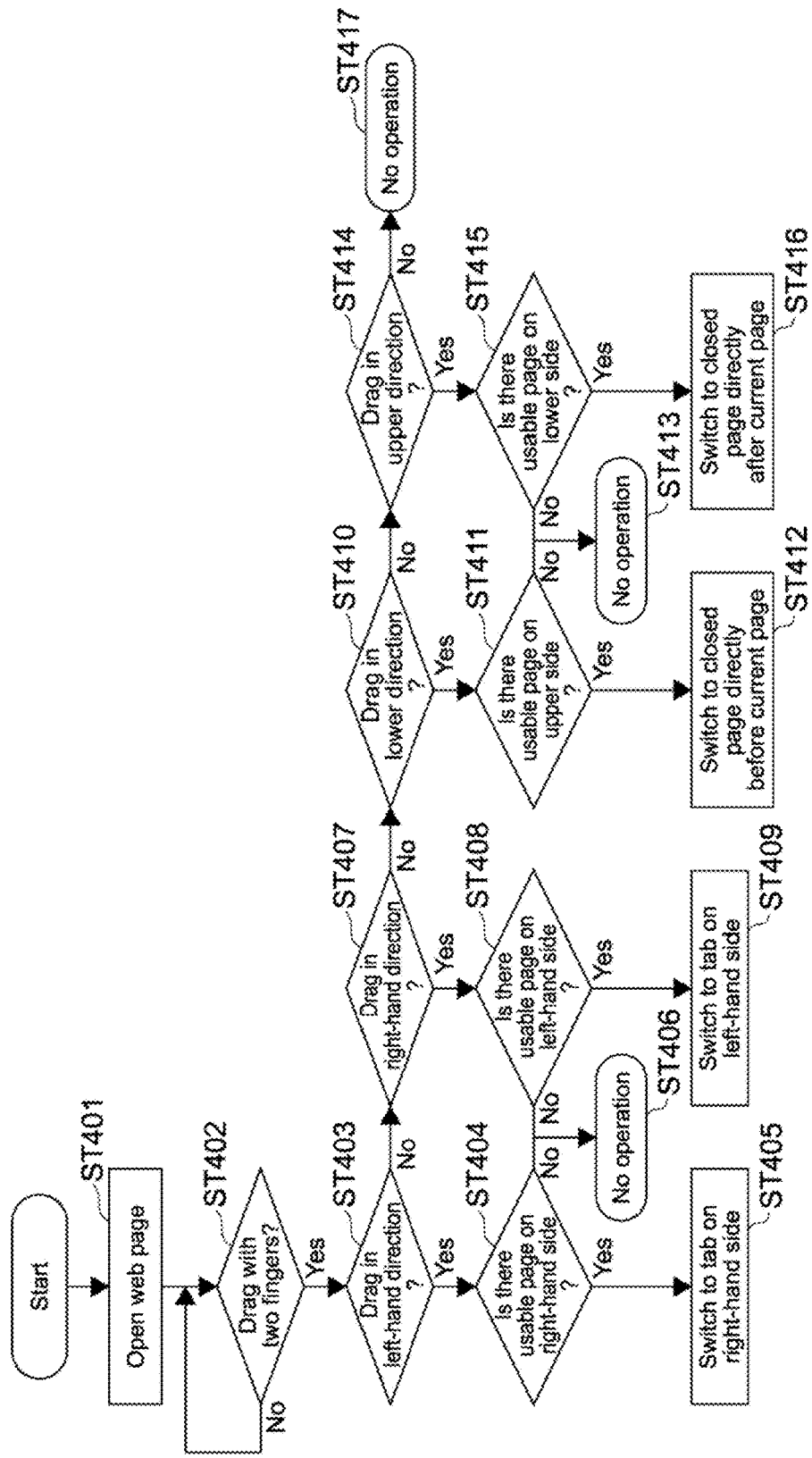

[Fig. 5A]
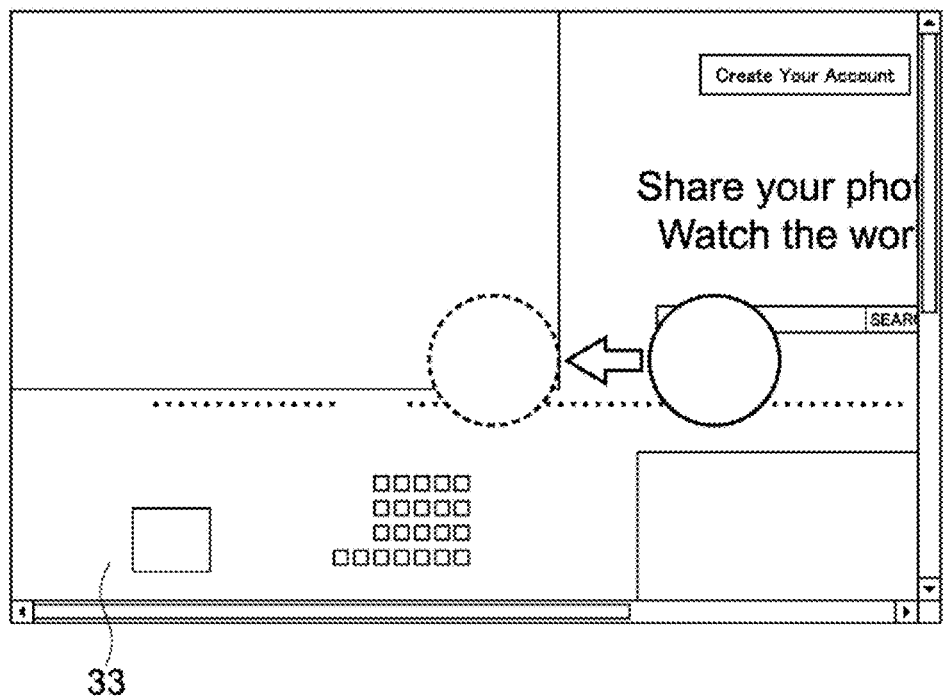
33
[Fig. 5B]
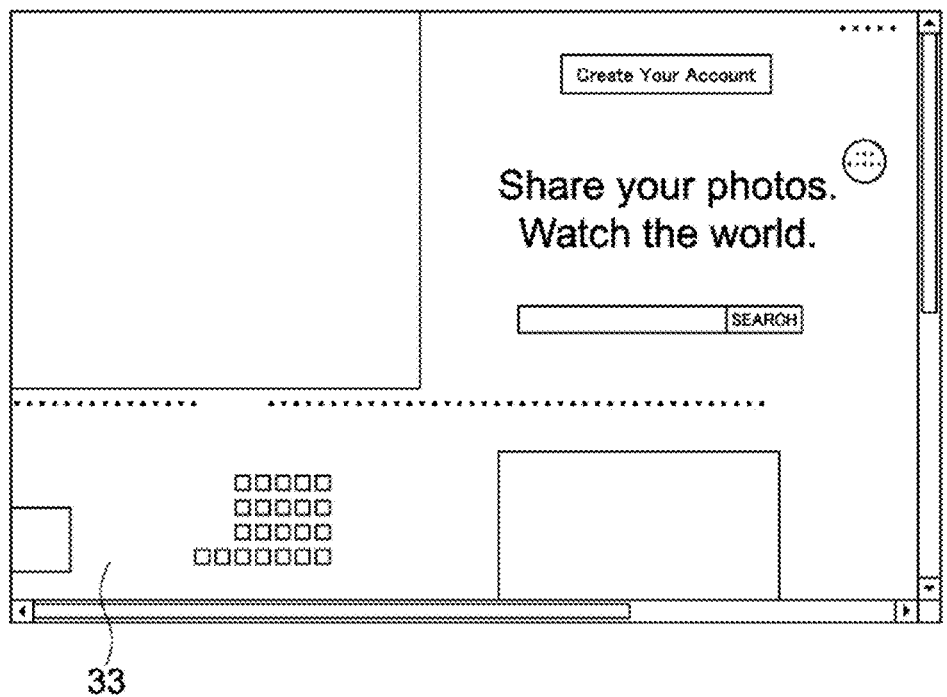
33

[Fig. 5C]
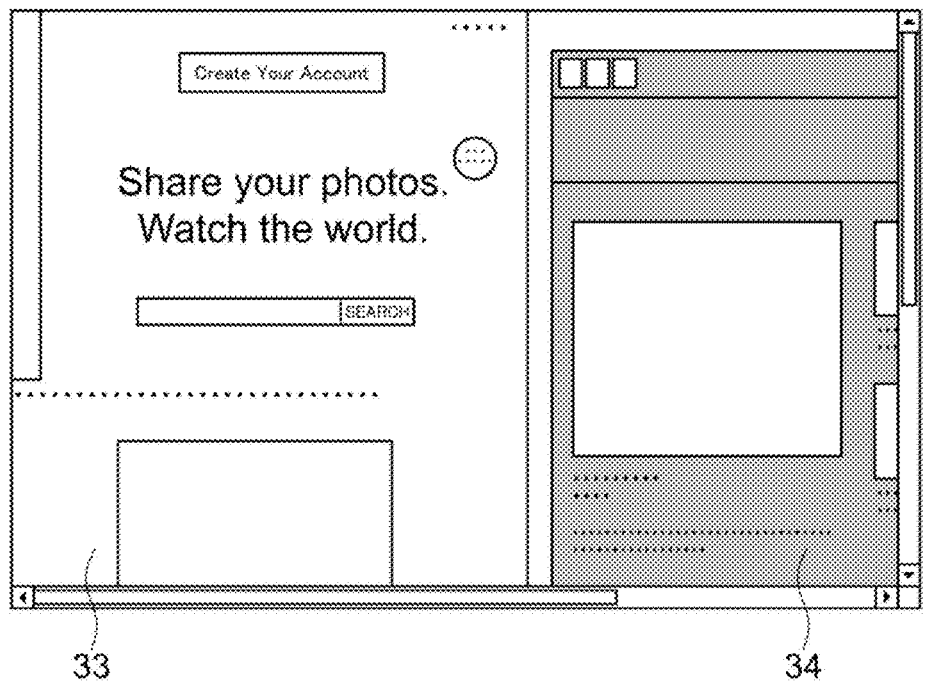
33  34
[Fig. 5D]
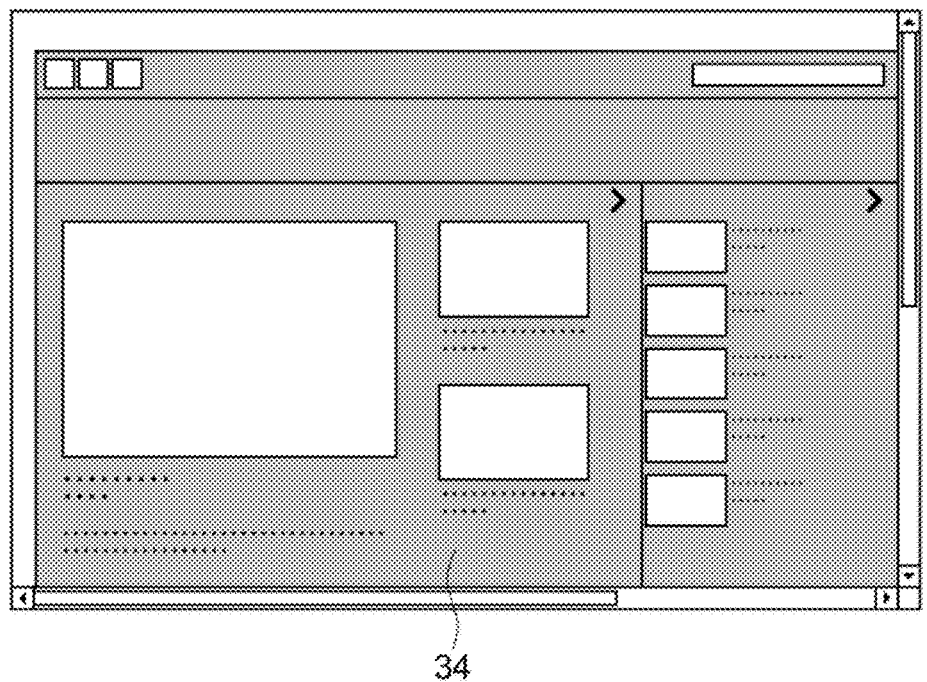
34

[Fig. 6A]
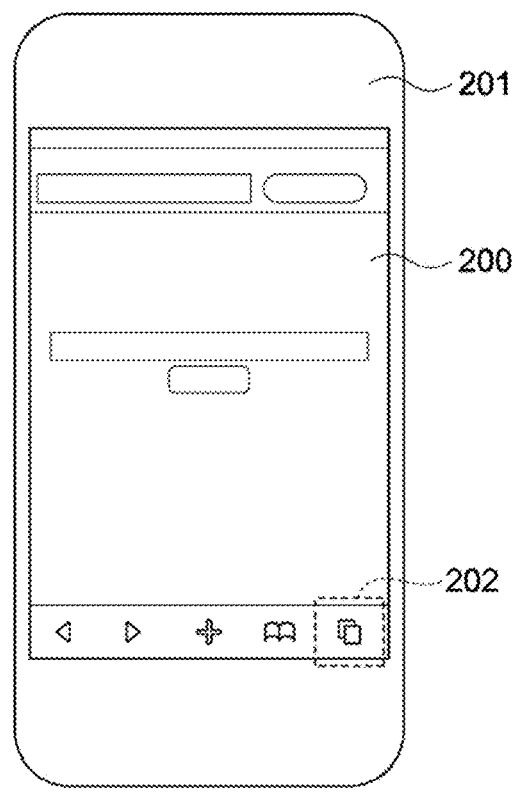
[Fig. 6B]
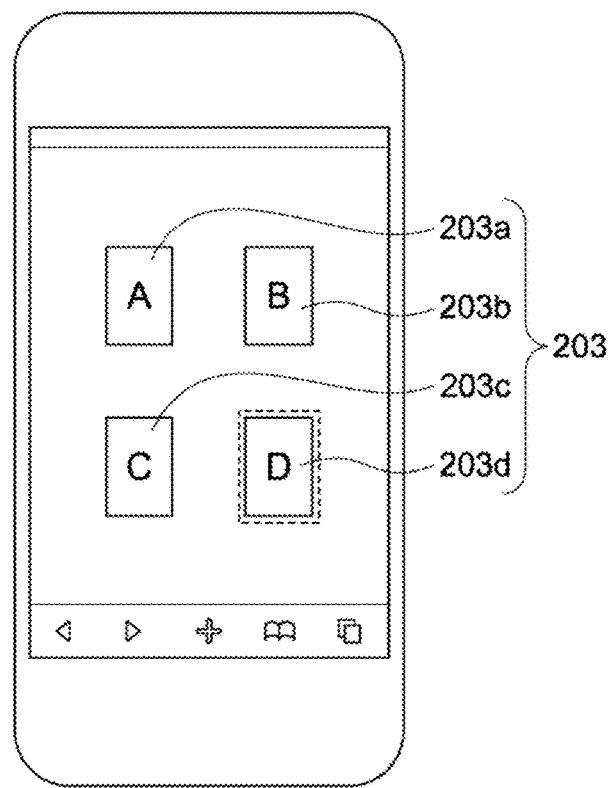

[Fig. 6C]
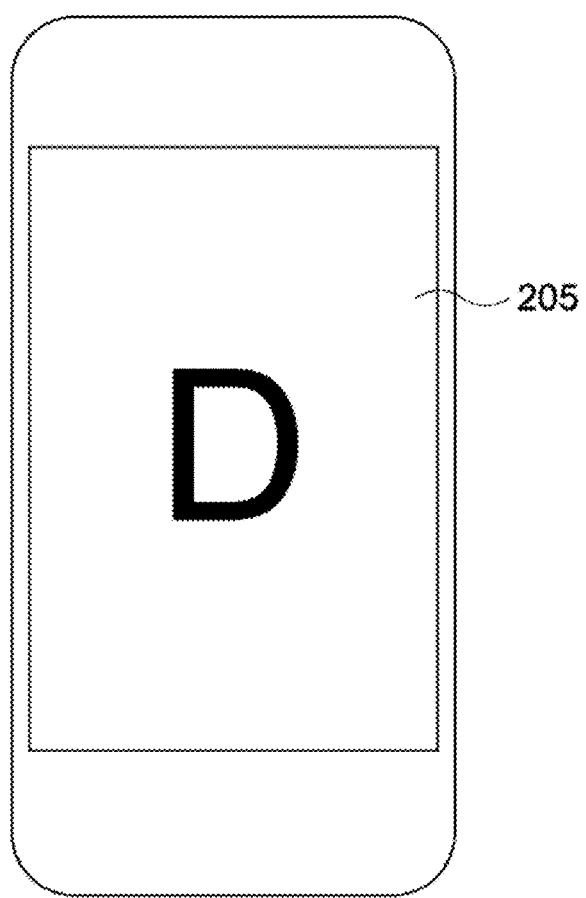

[Fig. 7]
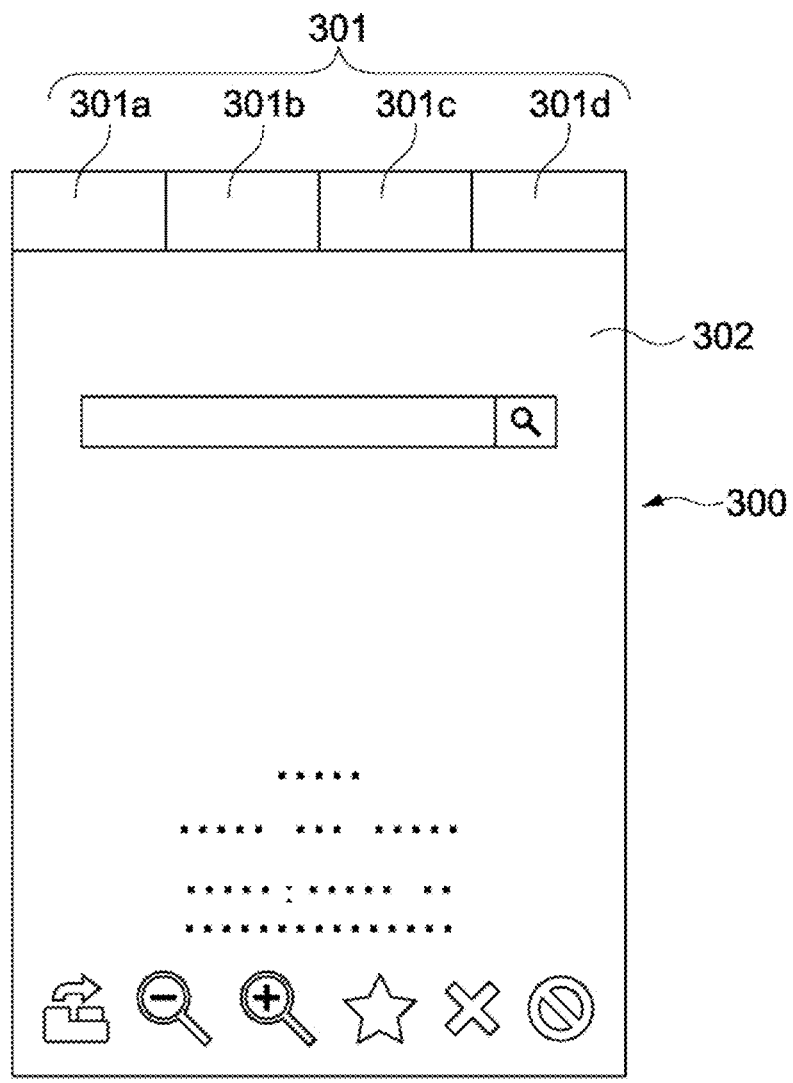

[Fig. 8]
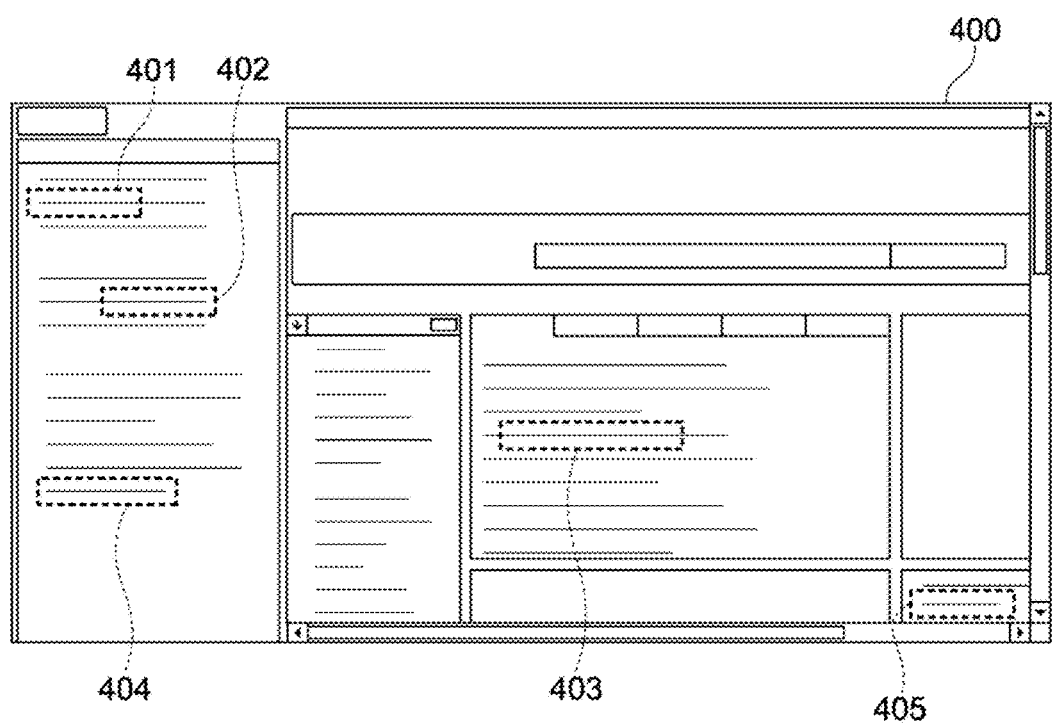

GESTURE DETECTION ON A DISPLAY DEVICE

CROSS-REFERENCE TO RELATED APPLICATION

The present application is a national phase entry under 35 U.S.C. § 371 of International Application No. PCT/JP2012/002483 filed Apr. 10, 2012, published on Oct. 26, 2012, as WO 2012/144160 A1, which claims priority from Japanese Patent Application No. JP 2011-092917 filed in the Japanese Patent Office on Apr. 19, 2011.

TECHNICAL FIELD

The present disclosure relates to an electronic apparatus, a display method, and a program.

BACKGROUND ART

In a portable terminal such as a smart phone including a touch screen, by displaying a list of tabs on a browser and then selecting a tab from the list, a web page corresponding to the tab selected on the browser is displayed. Japanese Patent Application Laid-open No. 2004-030145 discloses a technique relating to this.

CITATION LIST

Patent Literature

[PTL 1]
Japanese Patent Application Laid-open No. 2004-030145

SUMMARY OF INVENTION

In the technique of selecting a tab from a list, for switching tabs, it is necessary to perform a touch operation performed on a touch screen in order to display the tabs in the list and then perform a further touch operation for selecting the tab.

In view of the above-mentioned circumstances, there is a need for providing an electronic apparatus, a display method, and a program, that are capable of tabs by switching tabs by an easy operation.

Accordingly, the embodiments of the present disclosure are provided. According to an illustrative embodiment, an electronic apparatus is provided. The apparatus includes a display and an input apparatus operable to detect a gesture on the display. When the display is displaying a first page and the input apparatus detects a drag operation, the display displays a second page in response to the drag operation.

As mentioned above, according to the present disclosure, it is possible to switch an easy operation.

BRIEF DESCRIPTION OF DRAWINGS

FIG. 1 is a block diagram showing a configuration of an electronic apparatus of an embodiment according to the present disclosure.

FIG. 2 is a diagram showing a display example in a touch screen shown in FIG. 1.

FIG. 3 is an image diagram of an arrangement of tabs and web pages associated with histories in the embodiment.

FIG. 4 is a flow chart for illustrating a switching operation of web pages that is performed by a drag operation in the embodiment.

FIG. 5A is a diagram showing a state of web pages gradually disappearing and gradually appearing in the embodiment.

FIG. 5B is a diagram showing a state of the web pages gradually disappearing and gradually appearing in the embodiment.

FIG. 5C is a diagram showing a state of the web pages gradually disappearing and gradually appearing in the embodiment.

FIG. 5D is a diagram showing a state of the web pages gradually disappearing and gradually appearing in the embodiment.

FIG. 6A is a diagram for illustrating switching of web pages in tabs as a comparative example.

FIG. 6B is a diagram for illustrating the switching of the web pages in the tabs as the comparative example.

FIG. 6C is a diagram for illustrating the switching of the web pages in the tabs as the comparative example.

FIG. 7 is a diagram for illustrating switching of web pages in tabs as another comparative example.

FIG. 8 is a diagram showing a web page displayed on a browser in a touch screen according to another embodiment.

DESCRIPTION OF EMBODIMENTS

Hereinafter, embodiments according to the present disclosure will be described with reference to the drawings.

[Configuration of Electronic Apparatus]

FIG. 1 is a block diagram showing a configuration of an electronic apparatus of an embodiment according to the present disclosure.

Although the description will be made, for example, referring to an information processing apparatus such as a personal computer (PC) or a smart phone as an example of the electronic apparatus, the present disclosure is applicable to other electronic apparatuses each including a touch screen.

As shown in FIG. 1, the electronic apparatus 100 includes a controller 111 including a central processing unit (CPU), a read only memory (ROM) 112, a random access memory (RAM) 113, an input/output interface 115, and a bus 114 that connects them to each other.

The controller 111 appropriately accesses the RAM 113 or the like depending on needs and performs overall control of entire blocks of the electronic apparatus 100 while executing various types of arithmetic processing. The ROM 112 is a non-volatile memory that fixedly stores firmware such as an operating system (OS), programs, and various parameters that are executed by the controller 111. The RAM 113 is used as a working area or the like for the controller 111 and temporarily stores an OS, various running application programs, and various types of data being processed.

To the input/output interface 115, connected are a touch screen 116, a hard disk drive (HDD) 118 as a storage, a network 150, and the like.

In the HDD 118, the above-mentioned OS and various application programs and various types of data are stored. The network 150 connects to another network in a wired or wireless manner. The touch screen 116 is constituted of, for example, a touch panel as an input apparatus and a liquid crystal panel as a display unit.

The touch panel of the touch screen 116 refers to a transparent pressure-sensitive input apparatus superposed on a surface of the liquid crystal panel. The touch panel receives an input operation made by a user on an arbitrary point in a display screen. When the user performs a gesture operation such as a touch operation or a drag operation performed on the touch panel with a finger or a touch pen, the touch panel detects positional coordinates corresponding to this gesture operation and outputs them to the controller 111. It should be noted that as the input apparatus, as long as it is capable of detecting a gesture operation made by the user on the display unit, other than the touch panel, an arbitrary position detection device may be used irrespective of being contact type or non-contact type.

The liquid crystal panel of the touch screen 116 includes a display panel unit such as a liquid crystal display and a display driving unit that drives the display panel unit to perform display. The display driving unit is constituted of a pixel driving circuit for displaying on the display panel unit various types of display data input therein via the bus 114. The pixel driving circuit applies, for each of pixels arranged in a matrix form on the display panel unit, a driving signal based on an image signal at a predetermined horizontal/vertical driving timing in order to cause it to execute display.

In the electronic apparatus 100 configured as described above, as shown in FIG. 2, for example, a tabbed browser 20 can be displayed on the touch screen 116. Although the tabbed browser 20 is displayed on almost the entire touch screen 116, the tabbed browser 20 reduced in size may be displayed on a partial area of the touch screen 116 as shown in a broken line in FIG. 2.

In a window within the tabbed browser 20, by switching tabs, a web page in a tab that is currently displayed in the single window can be switched to a web page of another tab. In this embodiment, it is assumed that, for example, web pages in five tabs are set (registered) on the tabbed browser 20 so that the user feels that web pages 31 to 35 in the five tabs are arranged in left- and right-hand directions, for example, as shown in FIG. 3.

For each of the web pages 31 to 35, the user feels that web pages associated with a history of each of the web pages 31 to 35 are arranged in upper and lower directions. In FIG. 3, four web pages 33a to 33d shown in broken lines refer to web pages associated with the history of the web page 33 in the tab. The web pages 33a and 33b above the web page 33 refer to web pages that the user has opened before finding the web page 33. The web pages 33c and 33d below the web page 33 refer to web pages that the user has opened after finding the web page 33.

In FIG. 3, although not shown, the same as in the history associated with the web page 33 applies to each of the web pages 31, 32, 34, and 35.

Switching between the web pages 31 to 35 can be performed by a predetermined drag operation (drag gesture operation) made by the user on the touch screen 116.

[Switching Operation of Web Pages by Drag Operation]

FIG. 4 is a flow chart for illustrating a switching operation of web pages that is performed by a drag operation in this embodiment.

When the controller 111 detects that a gesture operation being a double tap is performed on an icon displayed on the touch screen 116, the controller 111 displays a window of the tabbed browser 20 and opens a web page therein (Step 401). The first opened web page may be a preset homepage in a tab or may be the last web page closed in that tab.

The controller 111 performs the following operations when a drag operation is performed with two fingers on the touch screen 116 with the web page being opened (Step 402).

When a drag operation in the left-hand direction is performed on the displayed web page in the tab (Step 403), the controller 111 determines whether or not a web page in a usable tab is present on a right-hand side (Step 404). For example, if the displayed web page in the tab is the web page 35 located at a right end in FIG. 3, it is determined that the web page in the usable tab is not present on the right-hand side.

When the controller 111 determines in Step 404 that the web page in the usable tab is present on the right-hand side, the controller 111 performs switching so that the web page in the tab on the right-hand side is displayed in the window of the tabbed browser 20 (Step 405). For example, if the displayed web page in the tab is the web page 33 shown in FIG. 3, the controller 111 switches to the web page 34 on the right-hand side. In this case, the controller 111 performs control so as to switch from displaying the displayed web page in the tab to displaying a web page in another tab by performing display such that the web page 33 moves in the left-hand direction to gradually disappear from the tabbed browser 20 and the web page 34 is translated (moves) in the left-hand direction following the web page 33 to gradually appear in the tabbed browser 20.

States of the web pages gradually disappearing and gradually appearing in this manner are shown in FIGS. 5A to 5D.

FIG. 5A shows a state when a drag operation is performed on the displayed web page 33 in the tab. In FIG. 5A, a solid-line circle expresses a drag operation with two fingers and a broken-line circle expresses a state when a drag operation in the left-hand direction is performed after that. According to this drag operation, first, a remaining part of the web page 33 on the right-hand side appears and is displayed as shown in FIG. 5B. Following this, as shown in FIG. 5C, the web page 33 in the tab gradually disappears to a left-hand side and the web page 34 in another (adjacent) tab gradually appears on the right-hand side.

Finally, as shown in FIG. 5D, the web page 33 in the tab completely disappears and the web page 34 in the tab is displayed on the browser. In this case, the web pages may be switched in synchronous with movement of a touch position according to the drag operation from the solid-line circle to the broken-line circle. Alternatively, the web pages may be switched so that the user can feel an inertial force in the movement of the touch position according to the drag operation from the solid-line circle to the broken-line circle (i.e., the user can feel as if the movement of the touch position according to the drag operation is accelerated).

When the controller 111 determines in Step 404 that the web page in the usable tab is not present on the right-hand side, the controller 111 does not perform the switching operation of the web pages in the tabs (Step 406). As described above, for example, if the displayed web page in the tab is the web page 35 located at the right end in FIG. 3, the controller 111 determines that the web page in the usable tab is not present on the right-hand side and does not perform the switching operation of the web pages in the tabs.

When the drag operation with the two fingers in Step 402 is an operation in the right-hand direction on the displayed web page in the tab (Step 407), the controller 111 determines whether a web page in a usable tab is present on the left-hand side (Step 408). For example, if the displayed web page in the tab is the web page 31 located at a left end in FIG. 3, it is determined that the web page in the usable tab is not present on the left-hand side.

When the controller 111 determines in Step 407 that the web page in the usable tab is present on the left-hand side, the controller 111 performs switching so that the web page in the tab on the left-hand side is displayed in the window of the tabbed browser 20 (Step 409). For example, if the displayed web page in the tab is the web page 33 shown in FIG. 3, the controller 111 switches to the web page 32 on the left-hand side. In this case, the controller 111 performs control so as to switch from displaying the displayed web page in the tab to displaying a web page in another tab by performing display such that the web page 33 moves in the right-hand direction to gradually disappear from the tabbed browser 20 and the web page 32 is translated in the right-hand direction following the web page 33 to gradually appear in the tabbed browser 20.

When the controller 111 determines in Step 408 that the web page in the usable tab is not present on the left-hand side, the controller 111 does not perform the switching operation of the web pages in the tabs (Step 406). As described above, for example, if the displayed web page in the tab is the web page 31 located at the left end in FIG. 3, the controller 111 determines that the web page in the usable tab is not present on the left-hand side and does not perform the switching operation of the web pages in the tabs.

When the drag operation with the two fingers in Step 402 is an operation in the lower direction on the displayed web page in the tab (Step 410), the controller 111 determines whether or not a usable web page associated with a history is present on an upper side (Step 411). For example, if the displayed web page is the web page 33*a* located at an upper end in FIG. 3, it is determined that the usable web page associated with the history is not present on the upper side. That is, the web page 33*a* means the first web page opened in that tab.

The controller 111 determines in Step 411 that the usable web page associated with the history is present on the upper side, the controller 111 switches to displaying a closed web page directly before the displayed web page (Step 412). For example, if the displayed web page in the tab is the web page 33 shown in FIG. 3, the controller 111 switches to the web page 33*b* in the upper side. In this case, the controller 111 performs control so as to switch from displaying the displayed web page to displaying the web page directly before the displayed web page by performing display such that the web page 33 moves in the lower direction to gradually disappear from the tabbed browser 20 and the web page 33*b* is translated in the lower direction following the web page 33 below it to gradually appear in the tabbed browser 20.

When the controller 111 determines in Step 411 that the usable web page associated with the history is not present on the upper side, the controller 111 does not perform the switching operation of the web pages associated with the history (Step 413). As described above, for example, if the displayed web page is the web page 33*a* located at the upper end in FIG. 3, the controller 111 determines that the usable web page associated with the history is not present on the upper side and does not perform the switching operation of the web pages associated with the history.

When the drag operation with the two fingers in Step 402 is an operation in the upper direction on the displayed web page in the tab (Step 414), the controller 111 determines whether or not a usable web page associated with the history is present on a lower side (Step 415). For example, if the displayed web page is the web page 33*d* located at a lower end in FIG. 3, it is determined that the usable web page associated with the history is not present on the lower side. That is, the web page 33*d* means the last web page opened in that tab.

When the controller 111 determines in Step 415 that the usable web page associated with the history is present on the lower side, the controller 111 switches to displaying a closed web page directly after the displayed web page (Step 416). For example, if the displayed web page in the tab is the web page 33 shown in FIG. 3, the controller 111 switches to the web page 33*c* in the lower side. In this case, the controller 111 performs control so as to switch from displaying the displayed web page to displaying the web page the web page directly after the displayed web page by performing display such that the web page 33 moves in the upper direction to gradually disappear from the tabbed browser 20 and the web page 33*c* is translated in the upper direction following the web page 33 above it to gradually appear in the tabbed browser 20.

When the controller 111 determines in Step 415 that the usable web page associated with the history is not present on the lower side, the controller 111 does not perform the switching operation of the web pages associated with the history (Step 413). As described above, for example, if the displayed web page is the web page 33*d* located at the lower end in FIG. 3, the controller 111 determines that the usable web page associated with the history is not present on the lower side and does not perform the switching operation of the web pages associated with the history.

When the drag operation with the two fingers in Step 402 is an operation other than the operations in the upper and lower directions and the left- and right-hand directions, that is, an operation in an oblique direction, the controller 111 does not perform the switching operation of the web pages (Step 417).

It should be noted that regarding the drag operations in the upper and lower directions and the left- and right-hand directions, the directions do not need to be precisely set, and, for example, a drag operation having a certain angle may be considered as one of the drag operations in the upper and lower directions and the left- and right-hand directions. Alternatively, based on the angle of the drag operation, the switching of the tabs or the switching of the web pages associated with the history may be replaced by page skip, for example. For example, when the angle of the drag operation in the left-hand direction is equal to or smaller than a predetermined angle with respect to a horizontal direction, the controller 111 may switch to a web page in a tab on the right-hand side. However, when the angle of the drag operation in the left-hand direction is larger than the predetermined angle with respect to the horizontal direction, the controller 111 may switch to not the web page in the tab on the right-hand side, but a web page in the second tab on the right-hand side.

[Advantages of Switching Operation of Web Pages]

According to the electronic apparatus 100, only by performing a drag operation on the touch screen 116, the user can switch the web pages.

As shown in FIG. 6A, when the user selects (performs a double tap on) a predetermined icon 202 on the touch screen 201 including a browser in which a web page 200 is displayed, a tab list 203 is opened on the browser as shown in FIG. 6B. When the user selects any one of tabs 203*a* to 203*d* therefrom, a web page 205 in another tab is opened as shown in FIG. 6C.

The switching of the web pages in the tabs in this manner is assumed.

As shown in FIG. 7, on a predetermined area, here, in an upper area, of a browser 300, a tab menu 301 is constantly displayed together with a web page 302. The user selects any one of tabs 301*a* to 301*d* from the tab menu 301. The switching of the web pages in the tabs in this manner is assumed.

In the technique shown in FIGS. 6A to 6C, a two-step selection operation is necessary for switching the web pages in the tabs, which is cumbersome in operation. In the technique shown in FIG. 7, for the area in which the tab menu is displayed, the area for displaying the web page is narrowed. In particular, in the case where as in the smart phone, the area of the touch screen is small and the area of an operation unit is also small because the operation unit also serves as a display unit, the cumbersome operation and the narrowed substantial display area become very inconvenient for the user.

In view of this, in the electronic apparatus 100, only by performing a drag operation on the touch screen 116, the user can switch the tabs, and thus, the user only needs to perform a one-step selection operation for switching the web pages in the tabs. Further, in the electronic apparatus 100, the area for displaying the tab menu does not need to be provided, and thus a web page as a substantial display area can be displayed on almost the entire area of the browser. That is, in the electronic apparatus 100 according to the embodiment of the present disclosure, the web page is displayed on almost the entire area of the browser and then, only by the one-step selection operation (single drag operation), the switching of the tabs can be performed. In addition, in the electronic apparatus 100 according to the embodiment of the present disclosure, not only the switching of the tabs, but also switching of the web pages associated with the history can be performed only by the same one-step selection operation (single drag operation). That is, in the electronic apparatus 100 according to the embodiment of the present disclosure, by performing the drag operations in the left- and right-hand directions for switching the tabs and performing the drag operations in the upper and lower directions for switching the web pages associated with the history, different types of switching of web pages can be performed. Thus, the user can perform the switching of the tabs and the switching of the web pages associated with the web history based on the direction of a drag operation, and thus the user can find a particular web page by an easy operation.

It should be noted that the above-mentioned directions of the drag operations for switching are merely one example and the web pages may be switched based on drag operations in directions different from the above-mentioned directions as a matter of course. For example, based on the drag operations in the upper and lower directions, the web pages in the tabs may be switched.

In the electronic apparatus 100 according to the embodiment of the present disclosure, when the drag operation is, for example, oriented in the left-hand direction on the touch screen 116, the currently displayed web page in the tab moves to the left end and disappears from the browser. At the same time, the web page in the tab to be displayed next is translated from the right end in the left-hand direction following the currently displayed web page in the tab almost continuously and appears in the browser. Further, the switching of the web pages associated with the history is performed in a similar display manner. Thus, the user can switch the web pages while viewing the display of the next web page.

In this case, for example, when the currently displayed web page in the tab disappears from the browser during a period of time when the drag operation is oriented in the left-hand direction on the touch screen 116 (e.g., state in FIG. 5D), the controller 111 displays the next web page in the tab on the browser. On the other hand, when the drag operation is terminated before the currently displayed web page in the tab disappears from the browser (e.g., states in FIGS. 5B and 5C), the controller 111 does not display the next web page in the tab but returns to the web page in the tab that is originally displayed. With this configuration, the user can switch the tabs or cancel the switching by a more intuitive operation. The switching by such an intuitive operation is applicable to not only the switching of the tabs, but also the switching of the web pages associated with the history.

The controller 111 may switch to the next tab unless the drag operation is switched to the right-hand direction during a period of time when, for example, according to the drag operation in the left-hand direction, the next web page in the tab is translated in the left-hand direction following the currently displayed web page in the tab. For example, when the drag operation is terminated in the state in FIG. 5C, the controller 111 does not return to the original tab, but switches to the next tab. However, when the drag operation is reversed to the right-hand direction during a period of time when according to the drag operation in the left-hand direction, the web page in the next tab is translated in the left-hand direction following the currently displayed web page in the tab, the controller 111 returns to the original tab. For example, when the drag operation is reversed in the state in FIG. 5C, the controller 111 does not switch to the next tab, but returns to the original tab. With this configuration, the user can switch the tabs or cancel the switching by a more intuitive operation. The switching by such an intuitive operation is also applicable to not only the switching of the tabs, but also the switching of the web pages associated with the history.

[Other Embodiment]

Although in the above-mentioned embodiment, not only the switching of the tabs, but also the switching of the web pages associated with the history are performed by the drag operation, switching to a web page associated with a hyperlink may be performed by the drag operation instead of the switching of the web pages associated with the history. For example, the switching of the tabs is performed in the case of the drag operations in the left- and right directions and the switching to the web page associated with the hyperlink is performed in the case of the drag operations in the upper and lower directions. FIG. 8 shows a web page 400 displayed on the browser in the touch screen 116 of the electronic apparatus 100. It is assumed that in this web page 400, for example, hyperlinks 401, 402, 403, 404, and 405 are embedded in the stated order from the above. For example, the web pages are switched in order from the hyperlink 405 in the case of the drag operation in the lower direction and the web pages are switched in order from the hyperlink 401 in the case of the drag operation in the upper direction. Thus, the user can perform the switching of the tabs and the switching of the web pages associated with the hyperlinks according to the drag direction, and thus the user can find a particular web page by an easy operation. It should be noted that in the case where hyperlinks are embedded in the left- and right-hand directions in the above-mentioned example, the hyperlink located on the left-hand side can be considered as an upper-level hyperlink, for example.

Embodiments of the present disclosure are not limited to the above-mentioned embodiments and various modifications can be made without departing from the gist of the present disclosure.

Although in the above-mentioned embodiment, the web pages are switched according to the drag operation with the two fingers, the web page may be switched according to a drag operation with a single finger, three fingers, or the like.

Although in the above-mentioned embodiment, the tabs are switched according to the drag operations in the left- and right-hand directions, the tabs may be switched according to the drag operations in the upper and lower directions.

Although in the above-mentioned embodiment, the switching of the tabs is performed such that the web page moves to gradually disappear from the browser and the next web page is translated following the web page to gradually appear in the browser. However, the tabs may be switched in other display manners. For example, when a predetermined drag operation or a drag operation with three fingers may be performed, a web page in a next tab may instantly appear.

Alternatively, based on a difference in drag operation, for example, based on whether a drag operation is performed with two fingers or three fingers, the tabs may be switched in different display methods.

The present disclosure can be also configured as follows.
(1) An electronic apparatus, including: a display; and an input apparatus operable to detect a gesture on the display, wherein when the display is displaying a first page and the input apparatus detects a drag operation, the display displays a second page in response to the drag operation.
(2) The apparatus according to (1), wherein the display and the input apparatus comprise a touch screen, and the input apparatus comprises a touch panel of the touch screen.
(3) The apparatus according to (1) or (2), wherein the first page is a web page and the second page is a web page.
(4) The apparatus according to (1), (2) or (3), wherein when the drag operation is a drag operation in a left-hand direction with respect to a user facing the display, the second page is a page to the right of the first page.
(5) The apparatus according to any one of (1) to (4), wherein when there is no usable page to the right of the first page, the display does not display a second page.
(6) The apparatus according to any one of (1) to (5), wherein when the drag operation is a drag operation in a right-hand direction with respect to a user facing the display, the second page is a page to the left of the first page.
(7) The apparatus according to any one of (1) to (6), wherein when there is no usable page to the left of the first page, the display does not display a second page.
(8) The apparatus according to any one of (1) to (7), wherein when the drag operation is a drag operation in a downward direction with respect to a user facing the display, the second page is a page above the first page.
(9) The apparatus according to any one of (1) to (8), wherein when there is no usable page above the first page, the display does not display a second page.
(10) The apparatus according to any one of (1) to (9), wherein when the drag operation is a drag operation in an upward direction with respect to a user facing the display, the second page is a page below the first page.
(11) The apparatus according to any one of (1) to (10), wherein when there is no usable page below the first page, the display does not display a second page.
(12) The apparatus according to any one of (1) to (11), wherein when the drag operation is a drag operation in any one of a left-hand direction, a right-hand direction, a downward direction, or an upward direction, with respect to a user facing the display, the second page is a page considered, relative to the first page, in a direction opposite to the direction of the drag operation.
(13) The apparatus according to any one of (1) to (12), wherein when there is no usable page in the direction opposite to the direction of the drag operation, the display does not display a second page.
(14) The apparatus according to any one of (1) to (13), wherein the drag operation is considered a drag operation in a respective one of the left-hand, right-hand, downward, and upward directions when an angle between a direction of the drag and the respective one of the left-hand, right-hand, downward, and upward directions is equal to or smaller than a predetermined angle.
(15) The apparatus according to any one of (1) to (14), wherein the first page includes one or more hyperlinks and the second page is a page associated with one of the hyperlinks.
(16) The apparatus according to any one of (1) to (15), wherein the first page disappears from the display during a period of time when the drag operation is performed.
(17) The apparatus according to any one of (1) to (16), wherein when the drag operation ends prior to disappearance of the first page from the display, the second page is not displayed.
(18) The apparatus according to any one of (1) to (17), wherein when a direction of the drag operation is reversed prior to ending the drag operation, the second page is not displayed.
(19) A page display method, including: displaying a first page on a display; detecting a gesture on the display; and when the gesture is a drag operation, displaying a second page in response to the drag operation.
(20) A non-transitory computer-readable medium having stored thereon a computer-readable program for implementing a page display method, the method including displaying a first page on a display; detecting a gesture on the display; and when the gesture is a drag operation, displaying a second page in response to the drag operation.
(21) An electronic apparatus, including:
  a touch screen; and
  a controller configured to display a web page in a first tab on a browser in the touch screen and switch from displaying the web page in the first tab to displaying a web page in a second tab according to a drag operation performed on the touch screen.
(22) The electronic apparatus according to Item (21), in which the controller is configured to perform, when the drag operation is oriented in a first direction on the touch screen, display such that the web page in the first tab moves in the first direction to disappear from the browser and the web page in the second tab is translated in the first direction following the web page in the first tab to appear in the browser, to thereby switch from displaying the web page in the first tab to displaying the web page in the second tab.
(23) The electronic apparatus according to Item (22), in which the controller is configured to perform, when the drag operation is oriented in a second direction orthogonal to the first direction on the touch screen, display such that the web page in the first tab moves in the second direction to disappear from the browser and a different web page associated with a web history of the web page in the first tab is translated in the second direction following the web page in the first tab to appear in the browser, to thereby switch from displaying the web page in the first tab to displaying the different web page associated with the web history of the web page in the first tab.
(24) The electronic apparatus according to Item (22) or (23), in which the controller is configured to perform, when the drag operation is oriented in a second direction orthogonal to the first direction on the touch screen, display such that the web page in the first tab moves in the second direction to disappear from the browser and a different web page associated with a hyperlink of the web page in the first tab is translated in the second direction following the web page in the first tab to appear in the browser, to thereby switch from displaying the web page in the first tab to displaying the different web page associated with the hyperlink of the web page in the first tab.

(25) The electronic apparatus according to any one of Items (22) to (24), in which the controller is configured to switch, when the web page in the first tab disappears from the browser during a period of time when the drag operation is oriented in the first direction on the touch screen, from displaying the web page in the first tab to displaying the web page in the second tab without redisplaying the web page in the first tab.

(26) The electronic apparatus according to any one of Items (22) to (25), in which the controller is configured to display, when the drag operation is oriented in a second direction opposite to the first direction during a period of time when the web page in the second tab is translated in the first direction following the web page in the first tab, the web page in the first tab without switching from displaying the web page in the first tab to displaying the web page in the second tab.

(27) A display method, including:
 displaying a web page in a first tab on a browser in a touch screen; and
 switching from displaying the web page in the first tab to displaying a web page in a second tab according to a drag operation performed on the touch screen.

(28) The display method according to Item (27), in which when the drag operation is oriented in a first direction on the touch screen, display is performed such that the web page in the first tab moves in the first direction to disappear from the browser and the web page in the second tab is translated in the first direction following the web page in the first tab to appear in the browser, to thereby switch from displaying the web page in the first tab to displaying the web page in the second tab.

(29) The display method according to Item (28), in which when the drag operation is oriented in a second direction orthogonal to the first direction on the touch screen, display is performed such that the web page in the first tab moves in the second direction to disappear from the browser and a different web page associated with a web history of the web page in the first tab is translated in the second direction following the web page in the first tab to appear in the browser, to thereby switch from displaying the web page in the first tab to displaying the different web page associated with the web history of the web page in the first tab.

(30) The display method according to Item (28) or (29), in which when the drag operation is oriented in a second direction orthogonal to the first direction on the touch screen, display is performed such that the web page in the first tab moves in the second direction to disappear from the browser and a different web page associated with a hyperlink of the web page in the first tab is translated in the second direction following the web page in the first tab to appear in the browser, to thereby switch from displaying the web page in the first tab to displaying the different web page associated with the hyperlink of the web page in the first tab.

(31) The display method according to any one of Items (28) to (30), in which when the web page in the first tab disappears from the browser during a period of time when the drag operation is oriented in the first direction on the touch screen, switching from displaying the web page in the first tab to displaying the web page in the second tab is performed without redisplaying the web page in the first tab.

(32) The display method according to any one of Items (28) to (31), in which when the drag operation is oriented in a second direction opposite to the first direction during a period of time when the web page in the second tab is translated in the first direction following the web page in the first tab, the web page in the first tab is displayed without switching from displaying the web page in the first tab to displaying the web page in the second tab.

(33) A program causing an electronic apparatus to execute the steps of:
 displaying a web page in a first tab on a browser in a touch screen; and
 switching from displaying the web page in the first tab to displaying a web page in a second tab according to a drag operation performed on the touch screen.

(34) The program according to Item (33), in which when the drag operation is oriented in a first direction on the touch screen, display is performed such that the web page in the first tab moves in the first direction to disappear from the browser and the web page in the second tab is translated in the first direction following the web page in the first tab to appear in the browser, to thereby switch from displaying the web page in the first tab to displaying the web page in the second tab.

(35) The program according to Item (34), in which when the drag operation is oriented in a second direction orthogonal to the first direction on the touch screen, display is performed such that the web page in the first tab moves in the second direction to disappear from the browser and a different web page associated with a web history of the web page in the first tab is translated in the second direction following the web page in the first tab to appear in the browser, to thereby switch from displaying the web page in the first tab to displaying the different web page associated with the web history of the web page in the first tab.

(36) The program according to Item (34) or (35), in which when the drag operation is oriented in a second direction orthogonal to the first direction on the touch screen, display is performed such that the web page in the first tab moves in the second direction to disappear from the browser and a different web page associated with a hyperlink of the web page in the first tab is translated in the second direction following the web page in the first tab to appear in the browser, to thereby switch from displaying the web page in the first tab to displaying the different web page associated with the hyperlink of the web page in the first tab.

(37) The program according to any one of Items (34) to (36), in which when the web page in the first tab disappears from the browser during a period of time when the drag operation is oriented in the first direction on the touch screen, switching from displaying the web page in the first tab to displaying the web page in the second tab is performed without redisplaying the web page in the first tab.

(38) The program according to any one of Items (34) to (37), in which when the drag operation is oriented in a second direction opposite to the first direction during a period of time when the web page in the second tab is translated in the first direction following the web page in the first tab, the web page in the first tab is displayed without switching from displaying the web page in the first tab to displaying the web page in the second tab.

The present application contains subject matter related to that disclosed in Japanese Priority Patent Application JP 2011-092917 filed in the Japan Patent Office on Apr. 19, 2011, the entire content of which is hereby incorporated by reference.

REFERENCE SIGNS LIST 100 electronic apparatus
111 controller
116 touch screen

The invention claimed is:

1. An electronic apparatus, comprising:
a display unit; and
an input apparatus configured to detect a gesture on the display unit, wherein the display unit is configured to:
switch display of pages in a first tab from a first page to a second page on the display unit based on the detection of the gesture that is a drag operation in a first direction;
switch the display of the pages in the first tab from the first page to a third page on the display unit based on the detection of the gesture that is the drag operation in a second direction,
wherein the first page, the second page and the third page of the first tab are web pages, wherein the second page and the third page are associated with a browsing history of the first page, and wherein the second page has been visited before the first page in the browsing history, and the third page has been visited after the first page in the browsing history; and
switch from the first tab to a second tab on the display unit based on an angle between one of the first direction or the second direction of the drag operation and at least one of a left-hand direction, a right-hand direction, a downward direction, or an upward direction that is greater than a threshold angle.

2. The electronic apparatus as recited in claim 1, wherein the display unit comprises a touch screen, and the input apparatus comprises a touch panel of the touch screen.

3. The electronic apparatus as recited in claim 1, wherein, based on a determination that the drag operation is in the left-hand direction based on an orientation of a user with respect to the display unit, the second page of the first tab is a page to a right of the first page of the first tab.

4. The electronic apparatus as recited in claim 3, wherein based on a determination that a usable page to the right of the first page of the first tab is absent, the display unit is further configured to prevent the switch from the first page of the first tab.

5. The electronic apparatus as recited in claim 1, wherein based on a determination that the drag operation is in the right-hand direction based on an orientation of a user with respect to the display unit, the second page of the first tab is a page to a left of the first page of the first tab.

6. The electronic apparatus as recited in claim 5, wherein based on a determination that a usable page to the left of the first page of the first tab is absent, the display unit is further configured to prevent the switch from the first page of the first tab.

7. The electronic apparatus as recited in claim 1, wherein based on a determination that the drag operation is in the downward direction based on an orientation of a user with respect to the display unit, the second page of the first tab is a page above the first page of the first tab.

8. The electronic apparatus as recited in claim 7, wherein based on a determination that a usable page above the first page of the first tab is absent, the display unit is further configured to prevent the switch from the first page of the first tab.

9. The electronic apparatus as recited in claim 1, wherein based on a determination that the drag operation is in the upward direction based on an orientation of a user with respect to the display unit, the second page of the first tab is a page below the first page of the first tab.

10. The electronic apparatus as recited in claim 9, wherein based on a determination that a usable page below the first page of the first tab is absent, the display unit is further configured to prevent the switch from the first page of the first tab.

11. The electronic apparatus as recited in claim 1, wherein based on a determination that the drag operation is in at least one of the left-hand direction, the right-hand direction, the downward direction, or the upward direction, based on an orientation of a user with respect to the display unit, the second page of the first tab is a page which, relative to the first page of the first tab, is in a direction opposite to a direction of the drag operation.

12. The electronic apparatus as recited in claim 11, wherein based on a determination that a usable page in the direction opposite to the direction of the drag operation is absent, the display unit is further configured to prevent the switch from the first page of the first tab.

13. The electronic apparatus as recited in claim 11, wherein the input apparatus is configured to determine the drag operation as a drag operation in a one of the left-hand direction, the right-hand direction, the downward direction, or the upward direction based on the determination that the angle between the first direction of the drag operation and the one of the left-hand direction, the right-hand direction, the downward direction, or the upward direction is equal to or smaller than the threshold angle.

14. The electronic apparatus as recited in claim 1, wherein the first page of the first tab gradually disappears from the display unit during a period of time of execution of the drag operation.

15. The electronic apparatus as recited in claim 1, wherein based on a determination that the drag operation ends prior to disappearance of the first page of the first tab from the display unit, the display unit is further configured to prevent the display of the second page in the first tab.

16. The electronic apparatus as recited in claim 1, wherein based on a determination that the first direction of the drag operation is reversed prior to end of the drag operation, the display unit is further configured to prevent the display of the second page in the first tab.

17. The electronic apparatus as recited in claim 1, wherein a plurality of hyperlinks is embedded on the first page of the first tab, and wherein the third page of the first tab is associated with one of the plurality of hyperlinks.

18. The electronic apparatus as recited in claim 1, wherein the first direction of the drag operation is opposite to the second direction of the drag operation.

19. A page display method, comprising:
displaying a first page of a first tab on a display unit;
detecting a gesture that is a drag operation on the display unit;
switching the display from the first page to a second page in the first tab on the display unit based on the gesture that is the drag operation in a first direction;
switching the display from the first page to a third page in the first tab on the display unit based on the detection of the gesture that is the drag operation in a second direction, wherein the first page, the second page and the third page of the first tab are web pages, wherein the second page and the third page are associated with a browsing history of the first page, and wherein the second page has been visited before the first page in the browsing history, and the third page has been visited after the first page in the browsing history; and switching from the first tab to a second tab on the display unit based on an angle between one of the first direction or the second direction of the drag operation and at least one of a left-hand direction, a right-hand direction, a downward direction, or an upward direction that is greater than a threshold angle.

20. A non-transitory computer-readable medium having stored thereon computer-readable instructions, which when executed by a computer, cause the computer to execute operations, the operations comprising:

displaying a first page of a first tab on a display unit;

detecting a gesture that is a drag operation on the display unit;

switching the display from the first page to a second page in the first tab based on the gesture that is the drag operation in a first direction;

switching the display from the first page to a third page in the first tab on the display unit based on the detection of the gesture that is the drag operation in a second direction, wherein the first page, the second page and the third page of the first tab are web pages, wherein the second page and the third page are associated with a browsing history of the first page, and wherein the second page has been visited before the first page in the browsing history, and the third page has been visited after the first page in the browsing history; and switching from the first tab to a second tab on the display unit based on an angle between one of the first direction or the second direction of the drag operation and at least one of a left-hand direction, a right-hand direction, a downward direction, or an upward direction that is greater than a threshold angle.

* * * * *